(12) United States Patent
Nakamura

(10) Patent No.: US 8,206,848 B2
(45) Date of Patent: Jun. 26, 2012

(54) SECONDARY BATTERY CELL, STACKED SECONDARY BATTERY AND BATTERY ASSEMBLY

(75) Inventor: Yoshiyuki Nakamura, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 728 days.

(21) Appl. No.: 12/373,643

(22) PCT Filed: Jun. 6, 2007

(86) PCT No.: PCT/JP2007/061849
§ 371 (c)(1),
(2), (4) Date: Jan. 13, 2009

(87) PCT Pub. No.: WO2008/010364
PCT Pub. Date: Jan. 24, 2008

(65) Prior Publication Data
US 2009/0263709 A1    Oct. 22, 2009

(30) Foreign Application Priority Data
Jul. 19, 2006  (JP) ................. 2006-196979

(51) Int. Cl.
*H01M 2/26* (2006.01)
(52) U.S. Cl. ..................... 429/161; 429/211
(58) Field of Classification Search .......... 429/152, 429/161, 211
See application file for complete search history.

(56) References Cited

U.S. PATENT DOCUMENTS

| 5,308,719 | A | * | 5/1994 | Mrotek et al. | ............ 429/211 X |
| 5,667,915 | A | * | 9/1997 | Loustau et al. | ............... 429/211 |
| 6,348,283 | B1 | * | 2/2002 | Mas et al. | ..................... 429/161 |
| 6,881,514 | B2 | * | 4/2005 | Ahn et al. | ................. 429/152 X |
| 2002/0061435 | A1 | | 5/2002 | Hisai | |
| 2009/0176153 | A1 | * | 7/2009 | Yoon et al. | ................. 429/211 X |
| 2010/0183921 | A1 | * | 7/2010 | Streuer et al. | ................. 429/211 |

FOREIGN PATENT DOCUMENTS

| EP | 1 530 247 A2 | 5/2005 |
| JP | 3-501427 | 3/1991 |

(Continued)

OTHER PUBLICATIONS

Extended European Search Report of EP 07767095.8 dated Aug. 12, 2011.

*Primary Examiner* — Stephen J. Kalafut
(74) *Attorney, Agent, or Firm* — Kenyon & Kenyon LLP

(57) ABSTRACT

A secondary battery includes collector electrodes, a contact area of the collector electrode in contact with a cathode or a anode, a terminal portion formed in the collector electrode and not in contact with the cathode or anode, and a connecting portion to which a conductive member is connected. As compared with cross-sectional area of the terminal portion forming a first current path between the connecting portion and a first portion of the contact area closest to the connecting portion in the contact area, cross-sectional area of a terminal portion forming a second current path between the connecting portion and a second portion positioned in a region of the periphery of the contact area and extending along the terminal portion, of which length to the connection portion is longer than path length of said current path, is made larger.

7 Claims, 8 Drawing Sheets

FOREIGN PATENT DOCUMENTS

| | | |
|---|---|---|
| JP | 9-199177 A | 7/1997 |
| JP | 2002-100340 A | 4/2002 |
| JP | 2002-157991 A | 5/2002 |
| JP | 2003-187857 A | 7/2003 |
| JP | 2004-031270 A | 1/2004 |
| JP | 2004-047239 A | 2/2004 |
| JP | 2005-174691 A | 6/2005 |
| JP | 2005-174844 A | 6/2005 |
| WO | 95/16282 A1 | 6/1995 |

\* cited by examiner

SECONDARY BATTERY CELL, STACKED SECONDARY BATTERY AND BATTERY ASSEMBLY

This is a 371 national phase application of PCT/JP2007/061849 filed 6 Jun. 2007, claiming priority to Japanese Patent Application No. 2006-196979 filed 19 Jul. 2006, the contents of which are incorporated herein by reference.

TECHNICAL FIELD

The present invention relates to a secondary battery cell, a stacked secondary battery formed by stacking the secondary battery cells, and to a battery assembly formed by stacking the stacked secondary batteries.

BACKGROUND ART

Conventionally, as disclosed in Japanese Patent Laying-Open Nos. 2005-174844, 2005-174691 and 9-199177, various types of stacked secondary batteries, which are formed by stacking a plurality of unit secondary battery cells and mounted as a motor driving source of an electric vehicle (EV) or a hybrid vehicle (HEV), have been proposed. A unit secondary battery cell includes an electrolyte layer, a cathode layer formed on one surface of the electrolyte layer, an anode layer formed on the other surface of the electrolyte layer, and collectors formed on surfaces of the cathode layer and anode layer.

By way of example, a stacked secondary battery described in Japanese Patent Laying-Open No. 2005-174844 is formed by stacking a plurality of unit secondary battery cells, and it includes a positive collector plate on one end surface and a negative collector plate on the other end surface in the direction of stacking the unit secondary battery cells.

A positive electrode tab or a negative electrode tab for taking out current is provided on the positive collector plate and the negative collector plate.

The current flowing through the positive collector plate and negative collector plate provided in unit secondary battery cell and stacked secondary battery concentrates to a path having the smallest electric resistance to the positive electrode tab or negative electrode tab. Therefore, at a portion where the path having the smallest electric resistance of the positive collector plate and the negative collector plate is positioned, temperature increases.

When temperature increases at a part of the negative collector plate and the positive collector plate, electrode reaction is activated at a part of unit secondary battery cells adjacent to the negative collector plate and the positive collector plate, and that part would be locally degraded.

DISCLOSURE OF THE INVENTION

The present invention was made in view of the problem described above, and its object is to provide a unit secondary battery cell aimed at preventing local degradation by avoiding concentration of current flowing through positive collector plate and negative collector plate to a portion, as well as to provide a stacked secondary battery formed by stacking the unit secondary battery cells and a battery assembly formed by stacking the stacked secondary batteries.

The present invention provides a secondary battery cell, including: a plate-shaped electrolyte layer; a cathode formed on one main surface of the electrolyte layer; an anode formed on the other main surface of the electrolyte layer; a collector electrode formed adjacent to the cathode or the anode; and a contact area of the collector electrode in contact with the cathode or the anode. Further, the secondary battery cell includes a terminal portion formed in the collector electrode and not in contact with the cathode or anode, and a connecting portion formed in the terminal portion to which a conductive member is connected. As compared with cross-sectional area of the terminal portion forming the first current path between the connecting portion and a first portion of the contact area closest to the connecting portion, the cross-sectional area of the terminal portion forming a second current path between the connecting portion and a second portion positioned in a periphery of the contact area and extending along the terminal portion, of which distance to the connecting portion is longer than the path length of said first current path, is made larger. Preferably, thickness of the terminal portion where the second current path is positioned is made thicker than the terminal portion where the first current path is positioned. Preferably, a portion functioning as the second current path is formed by rolling a part of the terminal portion. Preferably, a plurality of openings defining the first current path and the second current path are formed in the terminal portion, and width of the second current path defined by the openings is larger than width of the first current path defined by the openings. Preferably, the terminal portion is formed to protrude outward from an end surface of the cathode or the anode. Preferably, electric resistance of the first current path is made equal to electric resistance of the second current path.

The present invention provides a stacked secondary battery formed by stacking a plurality of secondary battery cells described above, wherein the collector electrode is provided on an end surface positioned in the direction of stacking the secondary battery cells.

The present invention provides a battery assembly formed by stacking a plurality of stacked secondary batteries described above, wherein the stacked secondary battery has first and second stacked secondary batteries stacked with cathodes facing to each other or anodes facing to each other. The collector electrode has a first collector electrode positioned between the first stacked secondary battery and the second stacked secondary battery for electrically connecting the first stacked secondary battery and the second stacked secondary battery, and a second collector electrode provided on a surface positioned opposite to the surface on which the first collector electrode is provided, and of different polarity from the first collector electrode. The terminal portion has a first terminal portion formed at the first collector electrode, and a second terminal portion formed at the second collector electrode.

In the secondary battery according to the present invention, the second current path longer than the first current path has a cross section larger than that of the first current path. Therefore, concentration of current flowing through the collector electrode to a specific path can be prevented. Therefore, local heat build-up can be prevented and, hence, local degradation of the unit secondary battery cell close to the collector electrode can be prevented.

BEST MODES FOR CARRYING OUT THE INVENTION

Embodiment 1

Figure 1:
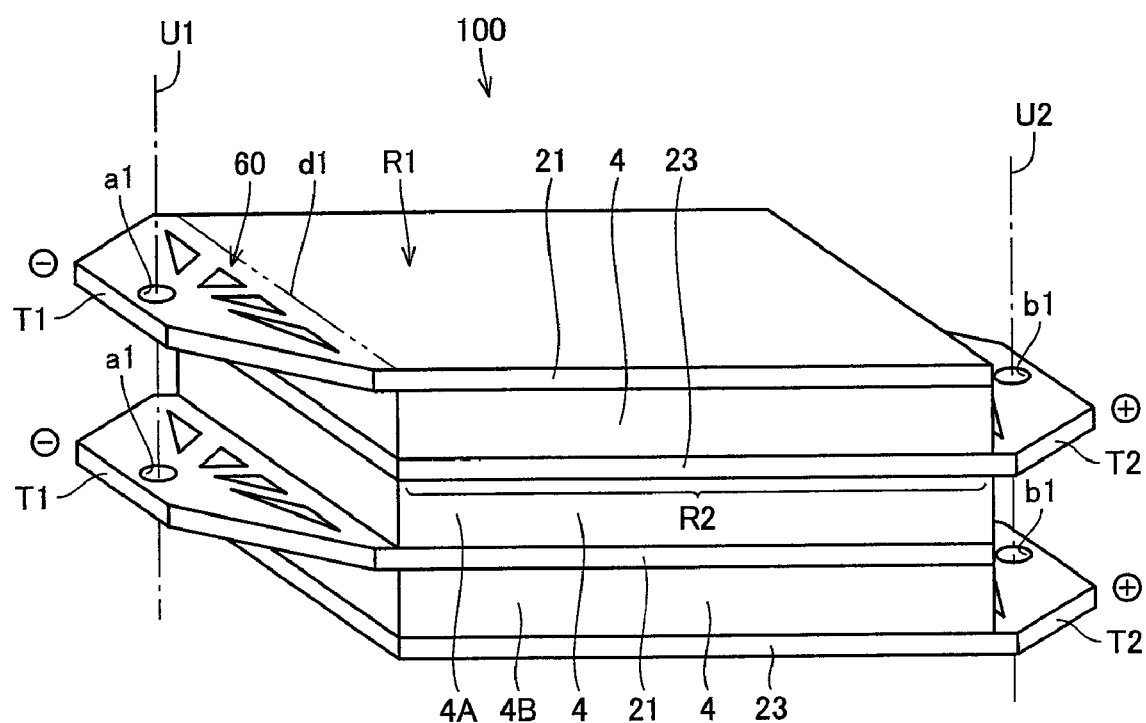
FIG. 1 is a perspective view of a battery assembly in accordance with Embodiment 1.

Referring to FIGS. 1 to 6, an electrode sheet (secondary battery cell), a bipolar secondary battery (stacked secondary battery) 4 and a battery assembly 100 in accordance with Embodiment 1 will be described. FIG. 1 is a perspective view of battery assembly 100 in accordance with Embodiment 1. As shown in FIG. 1, battery assembly 100 includes a plurality of bipolar secondary batteries 4, a plurality of negative collector electrodes 21 and positive collector electrodes 23.

Negative collector electrode 21 has a terminal portion T1 formed to allow connection to a wire U1 and, similarly, positive collector electrode 23 has a terminal portion T2 allowing connection to a wire U2. Terminal portions T1 and T2 have connection holes (connection portions) a1 and b1, to which wires U1 and U2 are connected for supplying current discharged from bipolar secondary battery to the outside or for supplying current to bipolar secondary battery 4 for charging.

Figure 2:
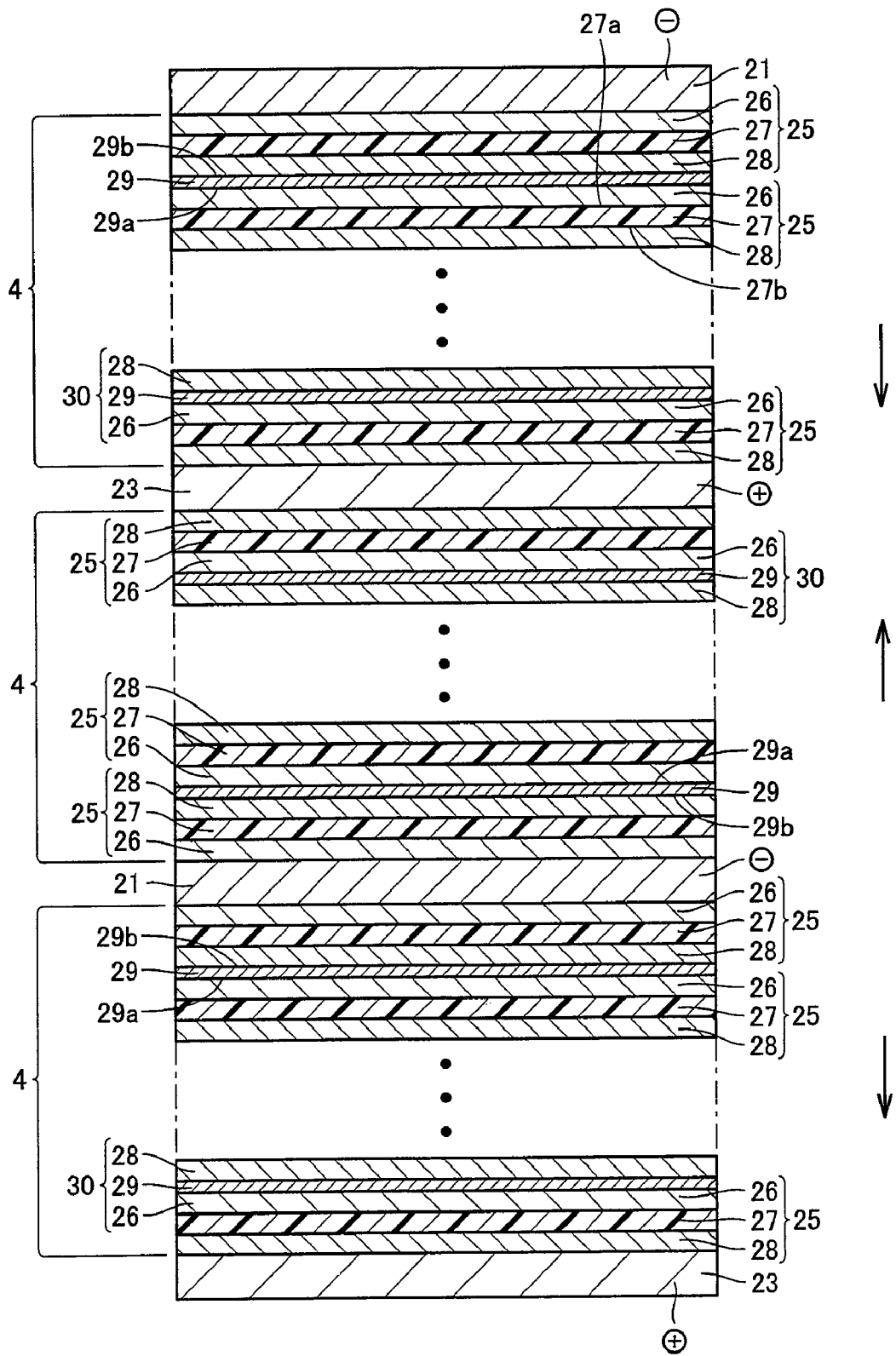
FIG. 2 is a cross-sectional view showing in detail a structure in the battery assembly.

FIG. 2 is a cross-sectional view showing in detail the structure in battery assembly 100. As shown in FIG. 2, bipolar secondary battery 4 is formed by successively stacking a plurality of electrode sheets (unit battery cells) 25 and collector foils 29 provided between each of the electrode sheets 25. Collector foil 29 has first and second surfaces 29a and 29b, respectively. The direction of stacking respective electrode sheets 25 is the same as the direction of stacking bipolar secondary batteries 4, and both correspond to the thickness direction of battery assembly 100.

Electrode sheet 25 includes an electrolyte layer 27 formed as a plate, an anode active material layer 26 formed on one main surface (first main surface) 27a of electrolyte layer 27, and a cathode active material layer 28 formed on the other main surface (second main surface) 27b of electrolyte layer 27. Electrode sheets 25 are stacked in series one after another with collector foil 29 inserted therebetween. Together, collector foil 29, anode active material layer 26, and cathode active material layer 28 form a portion 30 of secondary battery 4.

A plurality of bipolar secondary batteries 4 are stacked with the plate-shaped negative collector electrode 21 or the plate-shaped positive collector electrode 23 interposed. Negative collector electrode 21 and positive collector electrode 23 are provided between bipolar secondary batteries 4 and at opposite ends of battery assembly 100 positioned in the stacking direction of bipolar secondary batteries 4.

On a main surface of negative collector electrode 21 provided on one end of battery assembly 100, anode active material layer 26 of bipolar secondary battery 4 adjacent in the stacking direction is formed, and on a main surface of positive collector electrode 23 provided on the other end, cathode active material layer 28 of bipolar secondary battery 4 adjacent in the stacking direction is formed.

Referring to FIG. 1, by way of example, among the plurality of bipolar secondary batteries 4, negative collector electrode (first collector electrode) 21 is provided between bipolar secondary battery (first secondary battery) 4A and bipolar secondary battery (second secondary battery) 4B. On that surface of bipolar secondary battery 4A which is positioned opposite to the surface of bipolar secondary battery 4A having negative collector electrode 21 formed thereon, a positive collector electrode (second collector electrode) 23 is provided.

Bipolar secondary batteries 4 adjacent to each other with positive collector electrode 23 interposed are arranged such that cathode active material layers (cathodes) 28 oppose to each other as shown in FIG. 2, and on the front and rear surfaces of positive collector electrode 23, cathode active material layers 28 of adjacent bipolar secondary batteries are connected. Further, bipolar secondary batteries 4 adjacent to each other with negative collector electrode 21 interposed are arranged such that anode active material layers 26 oppose to each other, and on the front and rear surfaces of negative collector electrode 21, anode active material layers 26 of adjacent bipolar secondary batteries are connected. Specifically, bipolar secondary electrodes 4 are connected in parallel with each other.

In FIGS. 1 and 2, negative collector electrode 21 includes a contact area R1 to be in contact with anode active material layer 26 of electrode sheet 25 adjacent in the stacking direction of electrode sheets 25 with respect to negative collector electrode 21. Further, positive collector electrode 23 includes a contact area R2 in contact with cathode active material layer 28 of electrode sheet 25 adjacent in the stacking direction of electrode sheets 25 with respect to positive collector electrode 23. Terminal portions T1 and T2 protrude outward from end surfaces of bipolar secondary batteries 4 positioned in the stacking direction of electrode sheets 25.

Figure 3:
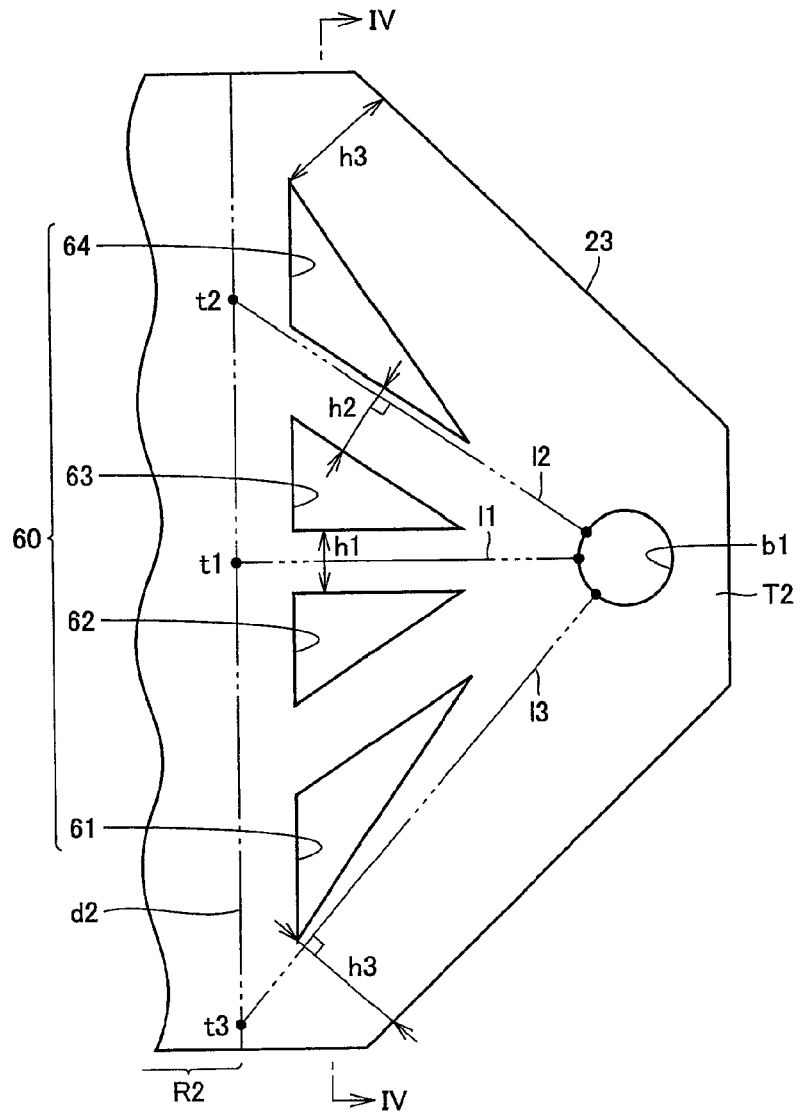
FIG. 3 is a plan view showing details of a terminal portion of positive collector electrode.

FIG. 3 is a plan view showing details of terminal portion T2 of positive collector electrode 23. As shown in FIG. 3, a plurality of openings 61 to 64 (60) defining current paths l1, l2 and l3 of the current flowing from contact area R2 to connection hole b1, and a connection hole b1 to be connected to wire U1 shown in FIG. 1 are formed in terminal portion T2.

Openings 61 to 64 are formed around connection hole b1, defining a plurality of current paths l1, l2 and l3 between contact area R2 and connection hole b1. Among the current paths l1 to l3, the current path (first current path) l1 having the shortest path length is positioned between connection hole b1 and a portion (first portion) t1 closest to the connection hole b1 of the periphery of contact area R2.

Of the current paths l1 to l3, current paths l2 and l3 other than current path l1 are positioned between connection hole b1 and portions (second portions) t2 and t3 positioned in an outer peripheral portion d2 (in the area) extending along the terminal, of the periphery of contact area R2, of which distance to connection hole b1 is longer than the path length of current path l1. Of the current paths l1 to l3, current path l3 positioned on the outermost peripheral side of terminal T2 is defined by the outer peripheral portion of terminal portion T2 and opening 61 that is positioned closest to the side of peripheral portion of terminal portion T2 among the openings 61 to 64.

Current paths l1 to l3 are formed such that path widths h1 to h3 of current paths l1 to l3 are made gradually larger as the path length becomes longer.

Figure 4:
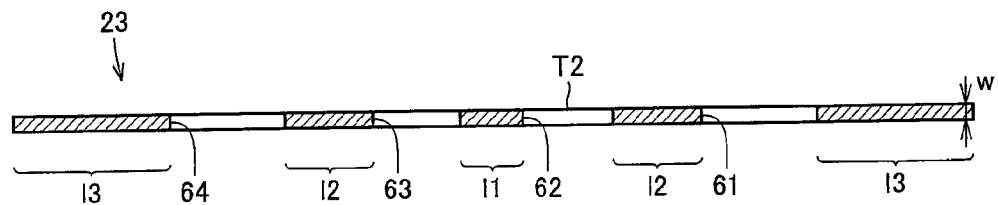
FIG. 4 is a cross-sectional view taken along the line IV-IV of FIG. 3.

FIG. 4 is a cross sectional view taken along the line IV-IV of FIG. 3. Referring to FIGS. 3 and 4, thickness W of terminal portion T2 is made approximately uniform for the entire surface. Therefore, it follows that cross section of terminal portion T2 where current paths l2 and l3 are positioned is larger than cross section of terminal portion T2 where current path l1 is positioned. Consequently, current paths l1 to l3 come to have electric resistance approximately equal to each other and, current flowing from contact area R2 to connection hole b1 flow through current paths l1 to l3 almost uniformly. Thus, concentration of current to a specific current path can be prevented.

Specifically, from any portion positioned on the side of terminal portion T2 in the outer peripheral portion of contact area R2 to connection hole b1, electric resistance is uniform. Therefore, heat build-up at a specific portion of terminal portion T2 can be prevented.

Therefore, referring to FIG. 2, it is possible to prevent a part of electrode sheet 25 adjacent to or close to positive collector electrode 23 in the stacking direction of electrode sheets 25, from being heated to a higher temperature than surrounding portions, and hence, it is possible to prevent partial degradation of electrode sheet 25. That the current paths have electric resistance equal to each other means not only that the electric resistance is the same but also that respective current paths have resistances sufficiently close to each other not to cause concentration of current to a specific current path.

In Embodiment 1, connection hole b1 is positioned on the line of symmetry of terminal portion T2 and outer peripheral portion d2 of contact area R2 extends to be in symmetry with respect to the line of symmetry. Therefore, as shown in FIG. 3, openings 61 to 64 come to be arranged radially about connection hole b1 and in symmetry with respect to the line of symmetry of terminal portion T2. The arrangement, however, is not limiting.

Specifically, openings 61, 62, 63 and 64 define the width of current paths such that width of the current path becomes larger as the length of current path positioned between connection hole b1 and the outer peripheral portion d2 of contact area R2 becomes longer. In FIG. 1, openings 61 to 64 similar to those of positive collector electrode 23 are also formed in negative collector electrode 21, and a plurality of current paths are defined.

The plurality of current paths extending from connection hole a1 to an outer peripheral portion d1 extending along terminal portion T1 of the outer peripheral portion of contact area R1 are adapted to have electric resistances approximately equal to each other. Therefore, at terminal portion T1 also, it is possible to prevent the current flowing from connection hole a1 to outer peripheral portion d1 of contact area R1 from concentrating to a specific current path and, therefore, functions and effects similar to those attained at terminal portion T2 can be attained.

In Embodiment 1, a plurality of openings 61 to 64 are formed at positive collector electrode 23 and negative collector electrode 21 arranged at end surfaces in the stacking direction of each of the bipolar secondary batteries 4, to make uniform the current flowing through terminal portions T1 and T2. Application, however, is not limited to terminal portions T1 and T2.

In FIG. 2, by way of example, if each collector foil 29 is formed protruding outward from the peripheral surface of bipolar secondary battery 4 and a wire is connected to each collector foil 29, it is possible to form openings similar to openings 61 to 64 described above at protruded portions of each collector foil 29, to attain uniform current flow.

Next, each of the components forming bipolar secondary battery 4 will be described in detail. Collector foil 29 is formed, by way of example, of aluminum. Here, even if the active material layer provided on the surface of collector foil 29 contains solid polymer electrolyte, it is possible to ensure sufficient mechanical strength of collector foil 29. Collector foil 29 may be formed by providing aluminum coating on metal other than aluminum, such as copper, titanium, nickel, stainless steel (SUS) or an alloy of these.

Cathode active material layer 28 includes a cathode active material layer and a solid polymer electrolyte. Cathode active material layer 28 may contain a supporting electrolyte (lithium salt) for improving ion conductivity, a conduction assistant for improving electron conductivity, NMP (N-methyl-2-pyrolidone) as a solvent for adjusting slurry viscosity, AIBN (azobisisobutyronitrile) as a polymerization initiator or the like.

As the cathode active material, composite oxide of lithium and transition metal generally used in a lithium ion secondary battery may be used. Examples of the cathode active material may include Li/Co based composite oxide such as $LiCoO_2$, Li/Ni based composite oxide such as $LiNiO_2$, Li/Mn based composite oxide such as spinel $LiMn_2O_4$, and Li/Fe based composite material such as $LiFeO_2$. Other examples are sulfated compound or phosphate compound of lithium and transition metal such as $LiFePO_4$; sulfide or oxide of transition metal such as $V_2O_5$, $MnO_2$, $TiS_2$, $MoS_2$ and $MoO_3$; $PbO_2$, AgO, NiOOH and the like.

The solid polymer electrolyte is not specifically limited and it may be any ion-conducting polymer. For example, polyethylene oxide (PEO), polypropylene oxide (PPO) or copolymer of these may be available. Such a polyalkylene oxide based polymer easily dissolves lithium salt such as $LiBF_4$, $LiPF_6$, $LiN(SO_2CF_3)_2$, or $LiN(SO_2C_2F_5)_2$, The solid polymer electrolyte is included in at least one of cathode active material layer 28 and anode active material layer 26. More preferably, the solid polymer electrolyte is included both in cathode active material layer 28 and anode active material layer 26.

As the supporting electrolyte, $Li(C_2F_5SO_2)_2N$, $LiBF_4$, $LiPF_6$, $LiN(SO_2C_2F_5)_2$ or a mixture of these may be used. As the electron conduction assistant, acetylene black, carbon black, graphite or the like may be used.

Anode active material layer 26 includes an anode active material layer and a solid polymer electrolyte. Anode active material layer may contain a supporting electrolyte (lithium salt) for improving ion conductivity, a conduction assistant for improving electron conductivity, NMP (N-methyl-2-pyrolidone) as a solvent for adjusting slurry viscosity, AIBN (azobisisobutyronitrile) as a polymerization initiator or the like.

As the anode active material layer, a material generally used in a lithium ion secondary battery may be used. If a solid electrolyte is used, however, it is preferred to use a composite oxide of carbon or lithium and metal oxide or metal, as the anode active material layer. More preferably, the anode active material layer is formed of a composite oxide of carbon or lithium and transition metal. Further preferably, the transition metal is titanium. Specifically, it is more preferred that the anode active material layer is of a composite oxide of titanium and lithium or a titanium oxide.

As the solid electrolyte forming electrolyte layer 27, by way of example, a solid polymer electrolyte such as polyethylene oxide (PEO), polypropylene oxide (PPO) or copolymer of these may be used. The solid electrolyte contains supporting electrolyte (lithium salt) for ensuring ion conductivity. As the supporting salt, $LiBF_4$, $LiPF_6$, $LiN(SO_2CF_3)_2$, $LiN(O_2C_2F_5)_2$ or a mixture of these may be used.

Specific examples of materials for cathode active material layer 28, anode active material layer 26 and electrolyte layer 27 are listed in Tables 1 to 3. Table 1 shows specific examples when electrolyte layer 27 is of an organic solid electrolyte, Table 2 shows specific examples when electrolyte layer 27 is of an inorganic solid electrolyte, and Table 3 shows specific examples when electrolyte layer 27 is of a gel electrolyte.

TABLE 1

| Cathode material | Anode material | Solid electrolyte | Remarks |
|---|---|---|---|
| $LiMn_2O_4$ | Li metal | P(EO/MEEGE) | electrolyte salt: $LiBF_4$ |
| — | Li metal | P(EO/PEG-22) | electrolyte salt: $LiN(CF_3SO_2)_2$(LiTFSI) |
| $LiCoO_2$ | carbon | PVdF base | — |
| $LiCoO_2$ | Li metal | ether based polymer P(EO/EM/AGE) | electrolyte salt: LiTFSI<br>ion conducting material binder: mix P(EO/EM) + $LiBF_4$ to cathode |
| $Li_{0.33}MnO_2$ | Li metal | P(EO/EM/AGE) | electrolyte salt: LiTFSI<br>ion conducting material binder: mix PEO-based solid polymer + LiTFSI to cathode |
| $Li_{0.33}MnO_2$ | Li metal | PEO base + inorganic additive | electrolyte salt: $LiClO_4$<br>ion conducting material: mix KB + PEG + LiTFSI to cathode |
| — | — | PEG-PMMA + PEG-borate ester | electrolyte salt: LiTFSI, BGBLi |
| — | — | PEO base + 10 mass %$0.6Li_2S + 0.4SiS_2$ | electrolyte salt: $LiCF_3SO_3$ |
| — | Li metal | PEO base + perovskite type $La_{0.55}Li_{0.35}TiO_3$ | electrolyte salt: $LiCF_3SO_3$ |
| Li metal | — | styrene/ethylene oxide-block-graft polymer(PSEO) | electrolyte salt: LiTFSI<br>ion conducting material: mix KB + PVdF + PEG + LiTFSI to cathode |
| $LiCoO_2$ | Li metal | P(DMS/EO) + polyether cross link | — |
| $Li_{0.33}MnO_2$ | Li metal | prepolymer composition mainly consisting of urethane acrylate (PUA) | electrolyte salt: LiTFSI<br>ion conducting material: mix KB + PVdF + PEG + LiTFSI to cathode |
| — | — | multibranched graft polymer (MMA + CMA + POEM) | electrolyte salt: $LiClO_4$ |
| $LiNi_{0.8}Co_{0.2}O_2$ | Li metal | PEO/multibranched polymer/filler based composite solid electrolyte (PEO + HBP + $BaTiO_3$) | electrolyte salt: LiTFSI<br>mix SPE + AB to cathode |
| — | — | PME400 + 13group metal alkoxide (as Lewis acid) | electrolyte salt: LiCl |
| — | — | matrix containing poly (N-methylvinylimidazoline) (PNMVI) | electrolyte salt: $LiClO_4$ |
| $LiCoO_2$ | Li metal | polymerize methoxy polyethylene glycol monomethyl meso acrylate using ruthenium complex by living radical polymerization, further polymerize with styrene | electrolyte salt: $LiClO_4$<br>cathode conducting material KB + binder PVdF |
| $LiCoO_2$ | Li metal | P(EO/EM) + ether based plasticizer | electrolyte salt: LiTFSI<br>cathode conducting material KB + binder PVdF |

TABLE 2

| Cathode material | Anode material | Solid Electrolyte | Remarks |
|---|---|---|---|
| $LiCoO_2$ | In | $95(0.6Li_2S \cdot 0.4SiS_2) \cdot 5Li_4SiO_4$<br>($Li_2S$—$SiS_2$ based melt rapid cooled glass) | state: glass |
| — | — | $70Li_2S \cdot 30P_2S_5Li_{1.4}P_{0.6}S_{2.2}$ sulfide glass<br>($Li_2S$—$P_2S_5$ based glass ceramics) | state: glass<br>forming method: mechanochemical |
| — | — | $Li_{0.35}La_{0.55}TiO_3$(LLT)<br>(perovskite type structure) | state: ceramics<br>form solid electrolyte porous body, fill pores with active material sol |
| — | — | $80Li_2S \cdot 20P_2S_5$<br>($Li_2S$—$P_2S_5$ based glass ceramics) | state: glass<br>forming method: mechanochemical |
| — | — | $xSrTiO_3 \cdot (1-x)LiTaO_3$<br>(perovskite type oxide) | state: ceramics |
| $LiCoO_2$ | Li—In metal | $Li_{3.4}Si_{0.4}P_{0.6}S_4$<br>(thio-LISICON Li ion conductor) | state: ceramics |
| — | — | $(Li_{0.1}La_{0.3})_xZr_yNb_{1-y}O_3$<br>(perovskite type oxide) | state: ceramics |
| — | — | $Li_4B_7O_{12}Cl$ | state: ceramics<br>combine PEG as organic compound |
| — | — | $Li_4GeS_4$—$Li_3PS_4$ based crystal $Li_{3.25}Ge_{0.25}P_{0.75}S_4$<br>(thio-LISICON Li ion conductor) | state: ceramics |
| — | Li metal<br>In metal | $0.01Li_3PO_4$—$0.63Li_2S$—$0.36SiS_2$<br>(thio-LISICON Li ion conductor) | state: ceramics |

TABLE 2-continued

| Cathode material | Anode material | Solid Electrolyte | Remarks |
|---|---|---|---|
| $LiCoO_2$ $LiFePO_4$ $LiMn_{0.6}Fe_{0.4}PO_4$ $LiNi_{0.8}Co_{0.15}Al_{0.05}O_2$ | Li metal $V_2O_5$ Li metal | $Li_3PO_{4-x}N_x$ (LIPON) (lithium phosphate oxinitride glass) $Li_3InBr_3Cl_3$ (rock salt type Li ion conductor) | state: glass state: ceramics |
| — | — | $70Li_2S \bullet (30\text{-}x)P_2S_5 \bullet xP_2O_5$ ($Li_2S$—$P_2S_5$—$P_2O_5$ based glass ceramics) | state: glass |
| $LiCoO_2$ etc. | Li metal Sn based oxide | $Li_2O$—$B_2O_3$—$P_2O_5$ base, $Li_2O$—$V_2O_5$—$SiO_2$ base, $Li_2O$—$TiO_2$—$P_2O_5$ base, LVSO etc. | state: glass |
| — | — | $LiTi_2(PO_3)_4$ (LTP) (NASICON type structure) | state: ceramics |

TABLE 3

| Cathode material | Anode material | Polymer base | Remarks |
|---|---|---|---|
| Ni based collector | Li metal | acrylonitrile vinyl acetate (PAN-VAc based gel electrolyte) | solvent: EC + PC electrolyte salt: $LiBF_4$, $LiPF_6$, $LiN(CF_3SO_2)_2$ |
| lithium electrode | lithium electrode | triethylene glycolmethyl methacrylate (polymethyl methacrylate (PMMA) based gel electrolyte) | solvent: EC + PC electrolyte salt: $LiBF_4$ |
| $V_2O_5$/PPy composite body | Li metal | methyl methacrylate (PMMA gel electrolyte) | solvent: EC + DEC electrolyte salt: $LiClO_4$ |
| Li metal | Li metal | PEO/PS polymer blend gel electrolyte | solvent: EC + PC electrolyte salt: $LiClO_4$ |
| Li metal | Li metal | alkylene oxide based polymer electrolyte | solvent: PC electrolyte salt: $LiClO_4$ |
| Li metal & $LiCoO_2$ | Li metal | alkylene oxide based polymer electrolyte | solvent: EC + GBL electrolyte salt: $LiBF_4$ |
| Li metal | Li metal | polyolefin based base polymer | solvent: EC + PC electrolyte salt: $LiBF_4$ |
| $Li_{0.36}CoO_2$ | Li metal | polyvinylidenefluoride (PVdF) + propylene hexafluoride (HFP) (PVdF-HFP gel electrolyte) | solvent: EC + DMC electrolyte salt: $LiN(CF_3SO_2)_2$ |
| $LiCoO_2$ | Li metal | PEO based and aclyl based polymer | solvent: EC + PC electrolyte salt: $LiBF_4$ |
| Li metal | Li metal | trimethylol propane ethoxylate acrylate (ether based polymer) | solvent: PC electrolyte salt: LiBETI, $LiBF_4$, $LiPF_6$ |
| — | — | EO-PO copolymer | electrolyte salt: LiTFSI, $LiBF_4$, $LiPF_6$ |
| — | — | poly aziridine compound | solvent: EC + DEC electrolyte salt: $LIPF_6$ |
| — | PAS (polyacene) | PVdF-HFP gel electrolyte | solvent: PC, EC + DEC electrolyte salt: $LiClO_4$, $Li(C_2F_5SO_2)_2N$ |
| — | — | urea based lithium polymer gel electrolyte | solvent: EC + DMC electrolyte salt: $LiPF_6$ |
| — | — | polyether/polyurethane based (PEO-NCO) gel electrolyte | solvent: PC electrolyte salt: $LiClO_4$ |
| — | — | cross-linked polyalkylene oxide based gel polymer electrolyte | — |

It most cases, the electrolyte used in a secondary battery is liquid. By way of example, in a lead storage battery, dilute sulfuric acid is used as the electrolytic solution. Positive collector electrode 23 and negative collector electrode 21 have some degree of strength. In Embodiment 1, each of the plurality of bipolar secondary batteries 4 is sandwiched between positive collector electrode 23 and negative collector electrode 21. When positive collector electrode 23 and negative collector electrode 21 are sandwiched between bipolar secondary batteries 4, a space between positive collector electrode 23 and bipolar secondary battery 4 or a space between negative collector electrode 21 and bipolar secondary battery 4 can be eliminated. Thus, strength of battery assembly 100 can be ensured.

Figure 5:
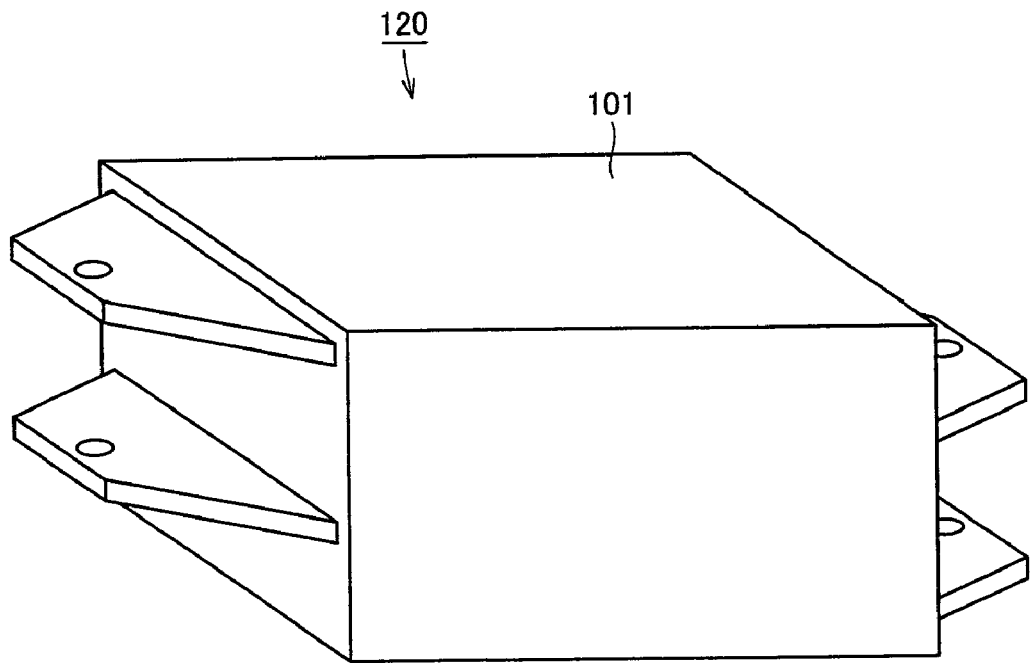
FIG. 5 is a perspective view of a battery pack formed by housing the battery assembly including the bipolar secondary batteries in a casing.

FIG. 5 is a perspective view of a battery pack 120 formed by housing battery assembly 100 having bipolar secondary batteries 4 structured in the above-described manner in a casing 101. As shown in FIG. 5, battery pack 120 includes casing 101 and battery assembly 100 housed in casing 101, and formed such that terminal portions T1 and T2 protrude outward through slits formed in casing 101.

Figure 6:
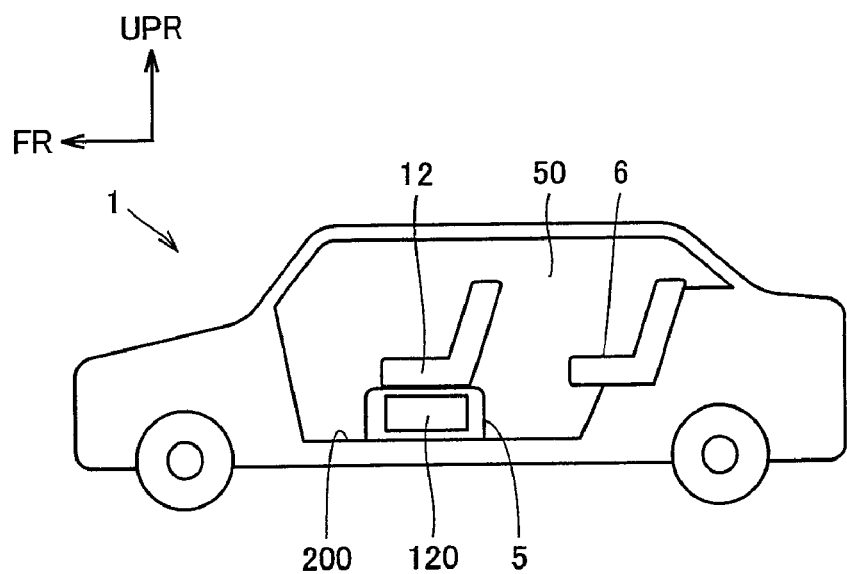
FIG. 6 is a schematic cross-sectional view showing a vehicle mounting the battery assembly in accordance with Embodiment 1.

FIG. 6 is a schematic cross-sectional view showing a vehicle mounting battery assembly 100 in accordance with Embodiment 1.

Referring to FIG. 6, a vehicle 1 is, for example, an electric vehicle using a rechargeable electric power supply as a power source, or a hybrid vehicle using an internal combustion engine such as a gasoline engine or a diesel engine and a rechargeable electric power supply as the power sources. Battery assembly 100 shown in FIG. 1 is mounted as a power source in such a vehicle.

In a passenger space (vehicle interior) 50 of vehicle 1, a front seat 12 and a rear seat 6 are arranged. In the passenger space 50, battery pack 120 including battery assembly 100 shown in FIG. 1 is arranged below front seat 12. Battery pack 120 is surrounded by a cover 5 arranged below front seat 12 and a floor 200. It is easier to make a space for housing battery pack 120 below front seat 12, than at other portions of vehicle 1. In most cases, a vehicle body consists of a portion that collapses and a portion that does not collapse but protects an occupant or occupants at the time of a crash. Specifically, by arranging battery pack 120 below front seat 12, it becomes possible to protect battery assembly 100 against any shock, if the vehicle body is hard hit.

Embodiment 2

Figure 7:
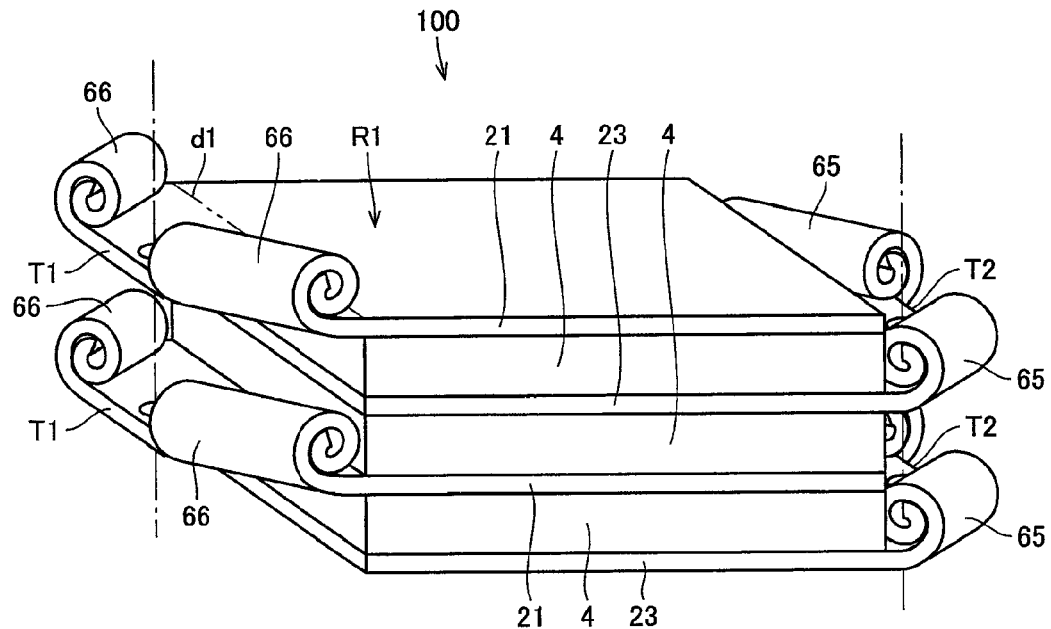
FIG. 7 is a perspective view of the battery assembly in accordance with Embodiment 2.

Referring to FIGS. 7 to 10, battery assembly 100 in accordance with Embodiment 2 will be described. Components that are the same as those shown in FIGS. 1 to 6 are denoted by the same reference characters and description thereof will not be repeated. FIG. 7 is a perspective view of battery assembly 100 in accordance with Embodiment 2. As shown in FIG. 7, rolled bodies 66 are formed at a peripheral portion of terminal portion T1, and rolled bodies 65 are formed at terminal portion T2.

Figure 8:
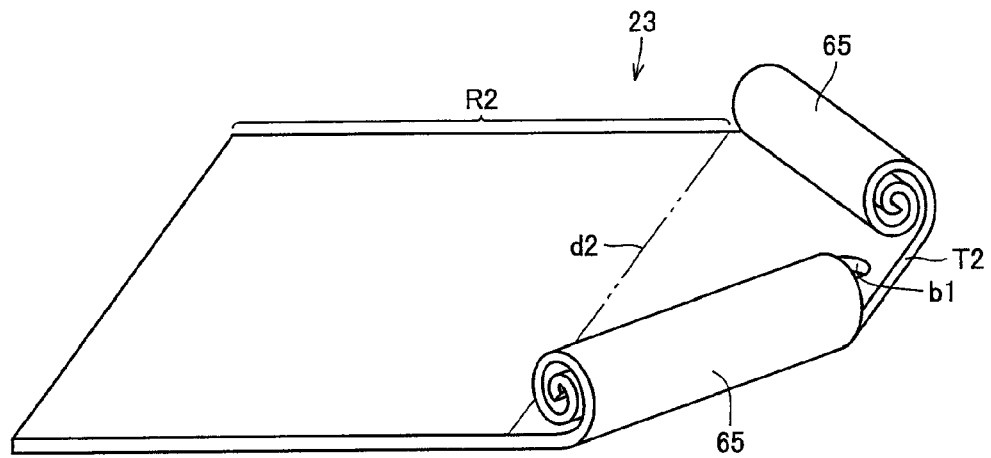
FIG. 8 is a perspective view of the positive collector electrode.
Figure 9:
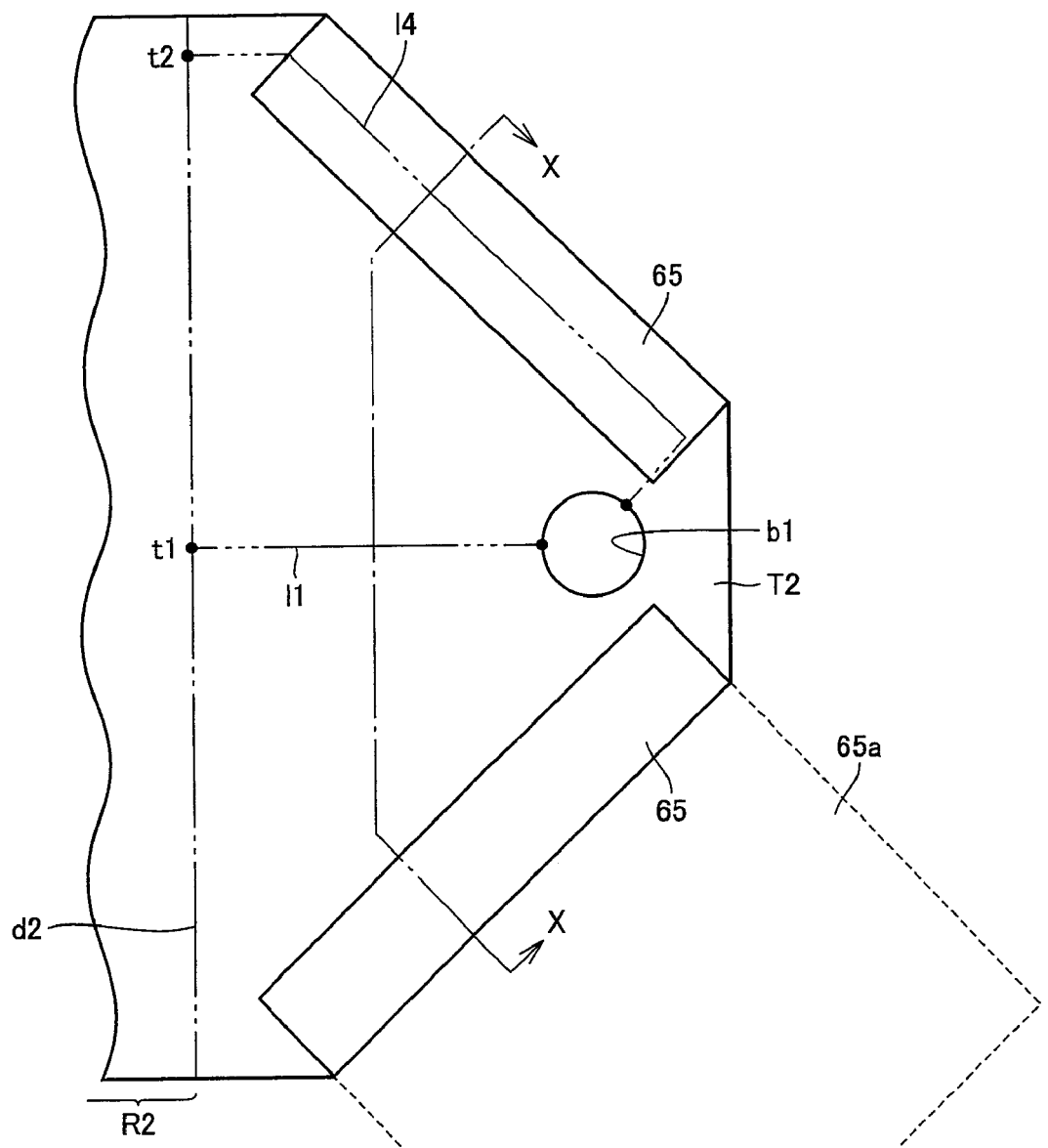
FIG. 9 is a plan view showing details of the terminal portion of positive collector electrode.

FIG. 8 is a perspective view of positive collector electrode 23, and FIG. 9 is a plan view showing details of terminal portion T2 of positive collector electrode 23. As shown in FIGS. 8 and 9, rolled body 65 extends from the periphery of connection hole b1 to an end portion along the width direction of terminal portion T2 of contact area R2.

A current path 14 positioned between connection hole b1 to a portion at opposite ends of outer peripheral portion d2 has longer path length than other current paths positioned between connection hole b1 and other portions of outer peripheral portion d2, and structured to include rolled body 65.

Figure 10:
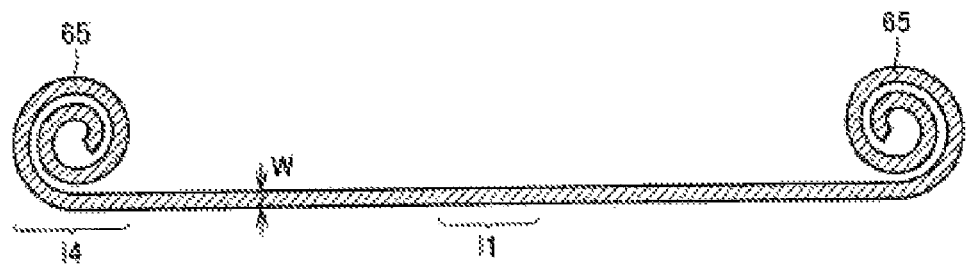
FIG. 10 is a cross-sectional view taken along the line X-X of FIG. 9.

FIG. 10 is a cross-sectional view taken along the line X-X of FIG. 9. Referring to FIG. 10, assuming that each of the current paths 11 and 14 has the constant path width, let us compare the current paths 11 and 14. Here, as current path 14 includes rolled body 65, it has larger cross section than current path 11.

Therefore, by way of example, electric resistance of current path 14 becomes equal or close to the electric resistance of current path 11 having the shortest current path.

The current flowing between connection hole b1 and contact area R2 is not concentrated to a specific current path such as current path 11 and it can be dispersed at least to current path 14. Since the current flowing between connection hole b1 and outer peripheral portion d2 of contact area R2 is dispersed to a plurality of current paths, a current path through which current flow concentrates can be prevented and, hence, local heat build-up of terminal portion T2 can be avoided.

Referring to FIG. 9, rolled body 65 is formed by rolling a protruded portion 65a formed integral with terminal portion T2 and protruding outward and, therefore, rolled body 65 can be formed in a simple manner. Further, root portion of rolled body 65a extends along current path 14 and, therefore, rolled body 65 formed by rolling protruded portion 65a can easily be positioned on current path 14 and, therefore, rolled body 65 can be incorporated easily as a part of current path 14.

As shown in FIG. 7, similar to positive collector electrode 23 and terminal portion T2, rolled body 66 is formed also on negative collector electrode 21 and terminal T1, so as to prevent local current concentration at terminal portion T1.

Figure 11:
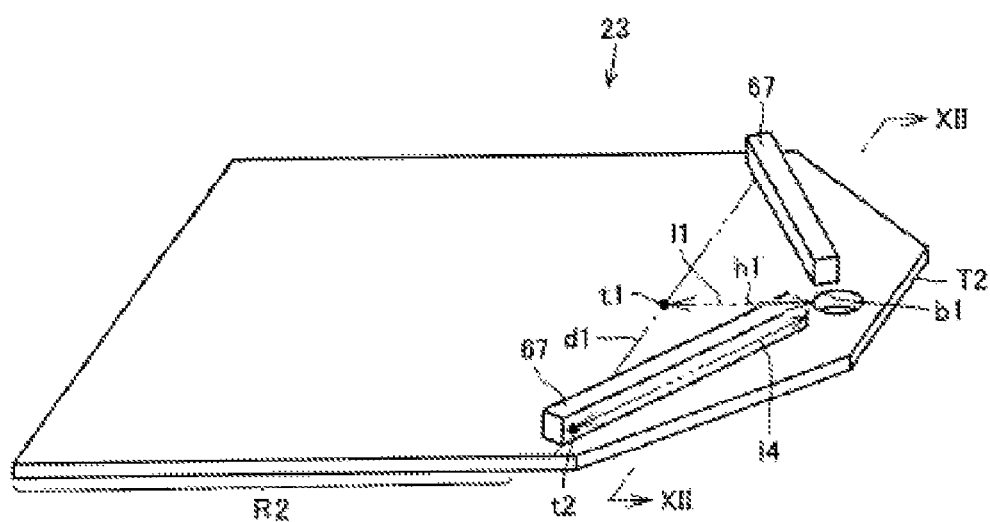
FIG. 11 is a perspective view showing a first modification of the positive collector electrode provided in the battery assembly in accordance with Embodiment 2.
Figure 12:
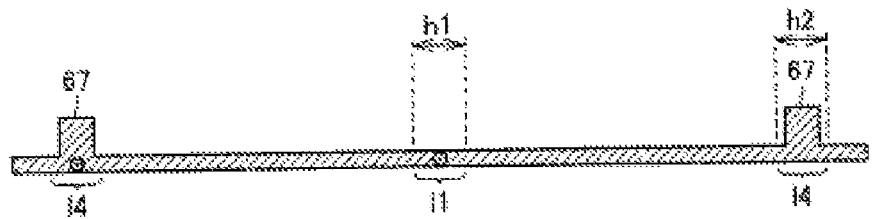
FIG. 12 is a cross-sectional view taken along the line XII-XII of FIG. 11.

FIG. 11 is a perspective view showing a first modification of positive collector electrode 23 provided in battery assembly 100 in accordance with Embodiment 2, and FIG. 12 is a cross-sectional view taken along the line XII-XII of FIG. 11. As shown in FIGS. 11 and 12, in place of rolled body 65, a thick conductive portion 67 may be provided to have electric resistance of current path 14 equal to electric resistance of current path 11. The thick portion 67 may be or may not be integral with terminal portion T2. Further, a plurality of thick portions may be provided. If the thick portions are provided on a plurality of portions, it is preferred to make thick portions 67 thinner as the current path length becomes longer.

Figure 13:
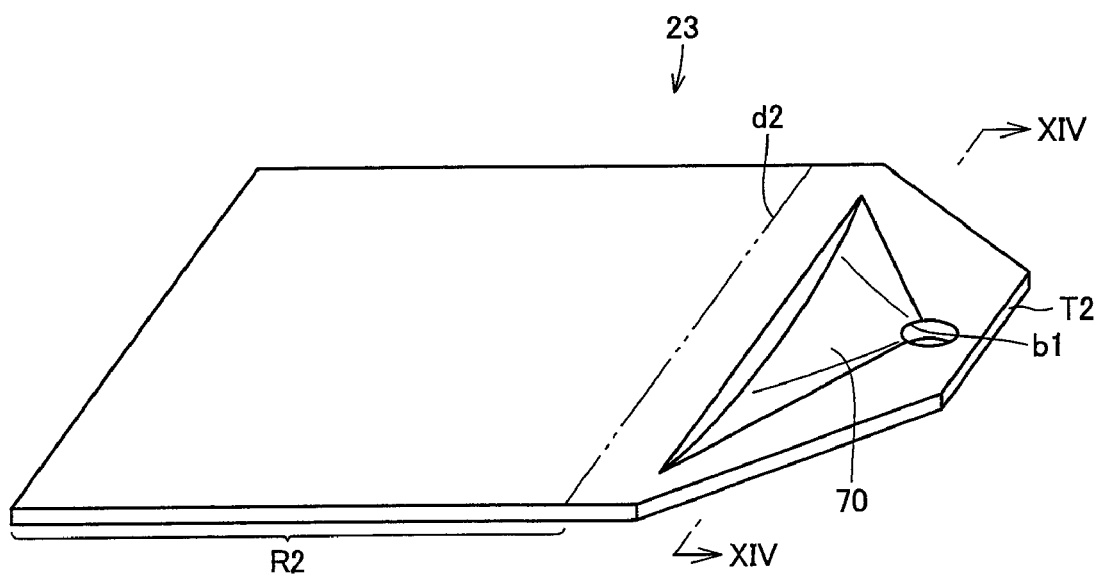
FIG. 13 is a perspective view showing a second modification of the positive collector electrode provided in the battery assembly in accordance with Embodiment 2.
Figure 14:
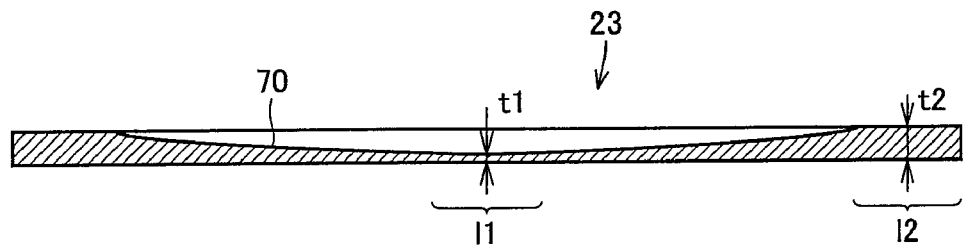
FIG. 14 is a cross-sectional view taken along the line XIV-XIV of FIG. 13.

FIG. 13 is a perspective view showing a second modification of positive collector electrode 23 provided in battery assembly 100 in accordance with Embodiment 2, and FIG. 14 is a cross-sectional view taken along the line XIV-XIV of FIG. 13. As shown in FIG. 13, as the current path becomes longer, thickness of terminal portion T2 on which the current path is positioned may be made thicker.

Specifically, as shown in FIG. 14, the surface of terminal portion T2 may be adopted to be a curved surface 70 such that terminal portion T2 becomes thicker from a portion where current path 11 having the shortest path length is positioned toward the outer peripheral portion of terminal portion T2.

By forming such curved surface 70, it becomes possible to disperse the current flowing between connection hole b1 to outer peripheral portion d2 of contact area R2 uniformly over approximately the entire surface of terminal portion T2.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

INDUSTRIAL APPLICABILITY

The present invention may be suitably applied to a secondary battery cell having an electrolyte layer, a cathode and an anode, to a stacked secondary battery formed by stacking the secondary battery cells, and to a battery assembly including a plurality of stacked secondary batteries.

The invention claimed is:

1. A secondary battery cell, comprising:
a plate-shaped electrolyte layer; a cathode formed on one main surface of said electrolyte layer;
an anode formed on the other main surface of said electrolyte layer; and
a collector electrode formed adjacent to said cathode or said anode;
wherein said collector electrode includes a contact area in contact with said cathode or said anode, a terminal portion formed in said collector electrode and not in contact with said cathode or said anode, and a connecting portion formed in said terminal portion to be connected to a conductive member; and wherein as compared with cross-sectional area of said terminal portion forming a first current path between said connecting portion and a first portion of said contact area closest to said connecting portion, cross-sectional area of said terminal portion forming a second current path between said connecting portion and a second portion of said contact area positioned at a peripheral portion of said contact area and extending along said terminal portion and having longer length to said connecting portion than path length of said first current path, is made larger, and
wherein thickness of said terminal portion where said second current path is positioned is made thicker than said terminal portion where said first current path is positioned.

2. A secondary battery cell, comprising:
a plate-shaped electrolyte layer; a cathode formed on one main surface of said electrolyte layer;
an anode formed on the other main surface of said electrolyte layer; and a collector electrode formed adjacent to said cathode or said anode; wherein said collector electrode includes a contact area in contact with said cathode or said anode, a terminal portion formed in said collector electrode and not in contact with said cathode or said anode, and a connecting portion formed in said terminal portion to be connected to a conductive member; and wherein as compared with cross-sectional area of said terminal portion forming a first current path between said connecting portion and a first portion of said contact area closest to said connecting portion, cross-sectional area of said terminal portion forming a second current path between said connecting portion and a second portion of said contact area positioned at a peripheral portion of said contact area and extending along said terminal portion and having longer length to said connecting portion than path length of said first current path, is made larger, and wherein a portion functioning as said second current path is formed by rolling a part of said terminal portion.

3. A secondary battery cell, comprising:

a plate-shaped electrolyte layer; a cathode formed on one main surface of said electrolyte layer;

an anode formed on the other main surface of said electrolyte layer; and a collector electrode formed adjacent to said cathode or said anode; wherein said collector electrode includes a contact area in contact with said cathode or said anode, a terminal portion formed in said collector electrode and not in contact with said cathode or said anode, and a connecting portion formed in said terminal portion to be connected to a conductive member; and wherein as compared with cross-sectional area of said terminal portion forming a first current path between said connecting portion and a first portion of said contact area closest to said connecting portion, cross-sectional area of said terminal portion forming a second current path between said connecting portion and a second portion of said contact area positioned at a peripheral portion of said contact area and extending along said terminal portion and having longer length to said connecting portion than path length of said first current path, is made larger, and wherein a plurality of openings defining said first current path and said second current path are formed in said terminal portion, and width of said second current path defined by said openings is larger than width of said first current path defined by said openings.

4. The secondary battery cell according to claim 1, wherein said terminal portion protrudes outward from an end surface of said cathode or said anode.

5. A secondary battery cell, comprising:

a plate-shaped electrolyte layer; a cathode formed on one main surface of said electrolyte layer;

an anode formed on the other main surface of said electrolyte layer; and a collector electrode formed adjacent to said cathode or said anode; wherein said collector electrode includes a contact area in contact with said cathode or said anode, a terminal portion formed in said collector electrode and not in contact with said cathode or said anode, and a connecting portion formed in said terminal portion to be connected to a conductive member; and wherein as compared with cross-sectional area of said terminal portion forming a first current path between said connecting portion and a first portion of said contact area closest to said connecting portion, cross-sectional area of said terminal portion forming a second current path between said connecting portion and a second portion of said contact area positioned at a peripheral portion of said contact area and extending along said terminal portion and having longer length to said connecting portion than path length of said first current path, is made larger, and wherein electric resistance of said first current path is equal to electric resistance of said second current path.

6. A stacked secondary battery formed by stacking a plurality of secondary battery cells according to claim 1, wherein said collector electrode is provided on an end surface positioned in the direction of stacking said secondary battery cells.

7. A battery assembly formed by stacking a plurality of said stacked secondary batteries according to claim 6, wherein said battery assembly has first and second stacked secondary batteries stacked with cathodes facing to each other or anodes facing to each other;

said collector electrode has a first collector electrode positioned between said first stacked secondary battery and said second stacked secondary battery for electrically connecting said first stacked secondary battery and said second stacked secondary battery, and a second collector electrode provided on a surface positioned opposite to the surface on which said first collector electrode is provided, and of different polarity from said first collector electrode; and said terminal portion has a first terminal portion formed at said first collector electrode, and a second terminal portion formed at said second collector electrode.

* * * * *